United States Patent

Chang et al.

[15] 3,701,125

[45] Oct. 24, 1972

[54] SELF-CONTAINED MAGNETIC BUBBLE DOMAIN MEMORY CHIP

[72] Inventors: Hsu Chang; Eugene R. Genovese, both of Yorktown Heights, N.Y.

[73] Assignee: Internaional Business Machines Corporation, Armonk, N.Y.

[22] Filed: Dec. 31, 1970

[21] Appl. No.: 103,046

[52] U.S. Cl..340/174 TF, 340/174 AC, 340/174 EB, 340/174 PM, 340/174 SR

[51] Int. Cl. ............................................G11c 11/14

[58] Field of Search ..................340/174 TF, 174 SR

[56] References Cited

UNITED STATES PATENTS

| | | | |
|---|---|---|---|
| 3,541,522 | 11/1970 | Bobeck et al. | 340/174 TF |
| 3,523,286 | 8/1970 | Bobeck et al. | 340/174 TF |
| 3,543,255 | 11/1970 | Morrow et al. | 340/174 TF |
| 3,440,444 | 4/1969 | Rapp | 307/238 |

*Primary Examiner*—James W. Moffitt
*Attorney*—Hanifin and Jancin and Jackson E. Stanlad

[57] ABSTRACT

A complete on-chip memory system for cylindrical bubble domains and a magnetic chip decoder for the system. Write and read decoding, memory storage, and sensing are provided on a single magnetic chip with a minimum number of interconnections and ease of fabrication. Decoding is achieved using magnetic overlays for propagation and current loops to provide selective switching at various locations. N control lines enable selective connections between $2^N$ domain generators and $2^N$ shift registers. The decoders have $2^N$ double propagation channels, each of which has two parallel paths. One path connects a generator to a shift register while the other path terminates in a bubble buster. Each shift register comprises a storage loop having bubble splitters, thus enabling NDRO. The storage loops are connected to a double propagation channel in a read decoder. Sensing means are connected to the output of the read decoder.

21 Claims, 6 Drawing Figures

SWITCH

INVENTORS
HSU CHANG
EUGENE R. GENOVESE

BY J. E. Harland
AGENT

FIG. 3A DECODER
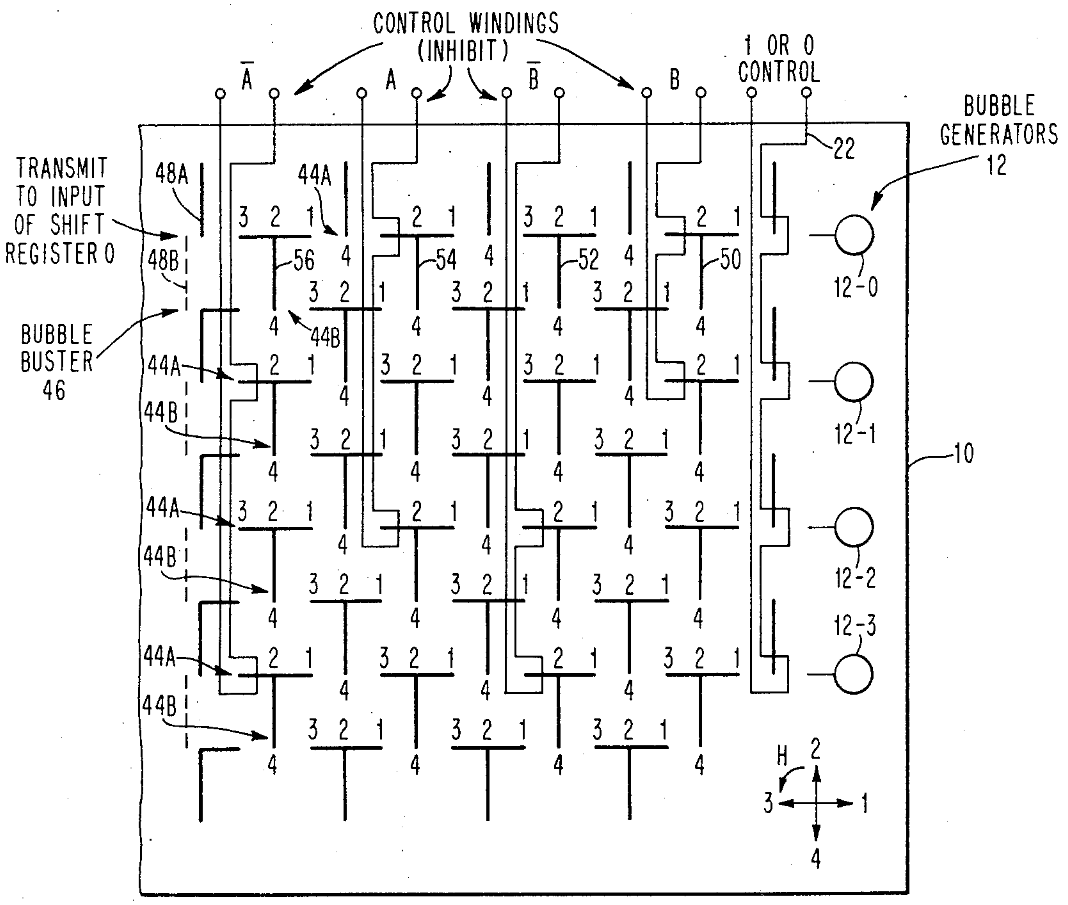
FIG. 3B
| REGISTER | CONTROL WINDINGS BINARY A | $\bar{A}$ | B | $\bar{B}$ |
|---|---|---|---|---|
| 0 | 0 | 1 | 0 | 1 |
| 1 | 1 | 0 | 0 | 1 |
| 2 | 0 | 1 | 1 | 0 |
| 3 | 1 | 0 | 1 | 0 |
FIG. 4 SWITCH
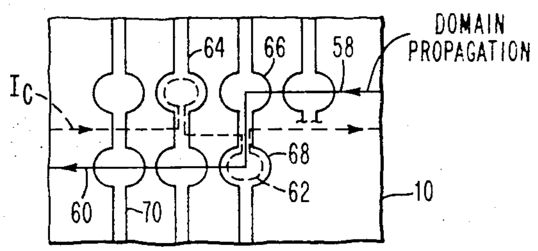

SELF-CONTAINED MAGNETIC BUBBLE DOMAIN MEMORY CHIP

CROSS-REFERENCES TO RELATED APPLICATIONS

Co-pending application Ser. No. 103,244, filed the same day as this application, describes a bubble domain splitter and buster suitable for use in this on-chip memory system.

BACKGROUND OF THE INVENTION

1. Field of the Invention

This invention relates to a complete bubble domain memory system formed on a magnetic chip, including magnetic decoding means.

2. Description of the Prior Art

At present, no complete bubble domain systems have been described in the literature. This is, perhaps, due to the fact that no proposals have been made for bubble domain decoders which are completely on-chip. Although the importance of decoders in memory systems is known, the customary manner for doing this function utilizes electronic decoding circuitry located external from the magnetic chip (sheet) in which the bubble domains are propagated.

As examples of prior storage systems, bubble domain shift registers having a storage density of $10^6$ bits/inch$^2$ and a potential data rate of $10^6$ bits/second have been demonstrated in zero magnetostriction garnet platelets. A. H. Bobeck et al "Uniaxial Magnetic Garnets for Bubble Domain Devices," *Applied Physics Letters*, Vol. 17, No. 135 (1970). In addition, two memory configurations have been proposed which utilize T and I bar permalloy pattern shift registers. The first configuration consists of extremely long shift registers ($10^5$ data bits per shift register) so that a $10^6$ bit chip contains only 10 shift registers. This will require only tens of interconnections and 10 detectors. A. H. Bobeck, "Application of Magnetic Bubble Domains in Orthoferrites," International Electron Devices Washington, Washington D. C., October 29–31, 1969. This configuration has the disadvantage of long latency time; for example, 0.1 second is required to read out $10^5$ bits, even at $10^6$ bits/second data rate.

The second memory configuration provides a common input/output channel linking all shift registers through gates so as to share the read and write circuits. P. I. Bonyhard "Application of Bubble Devices in Digital Systems," IEEE Transactions on Magnetics, 6, No. 4, December 1970. This configuration has a disadvantage in that many interconnections are required to gate the shift registers individually.

Accordingly, it is a primary object of this invention to provide an all-magnetic memory chip complete with decoding, storage, read, write and the detection function.

Another object of this invention is to provide a complete on-chip memory system having a minimum number of interconnections.

Still another object of this invention is to provide a complete on-chip memory system which does not require excessive circuitry and which does not have an excessive latency time.

A further object of this invention is to provide a complete on-chip memory system which is easily fabricated.

Another object of this invention is to provide a complete on-chip bubble domain memory which has small access time to memory locations.

Another object of this invention is to provide a complete on-chip magnetic bubble domain memory system requiring only a minimum amount of space.

Still another object of this invention is to clock and actuate all decoding, storage, read, write and detection functions with a simple and common rotating field (or its equivalent such as a two phase pulse field).

SUMMARY OF THE INVENTION

A complete bubble domain memory system is implemented on a magnetic chip. Magnetic decoders are used to write information into selected memory locations and to read information information from selected locations. The input to the write decoder is provided by a plurality of bubble domain generators or by a single generator connected selectively to various propagation channels in the write decoder. In the illustrated embodiments, shift registers are comprised of storage loops having bubble domain splitters for non-destructive readout. Individual detection means can be attached to each propagation channel of the read decoder or a single detection circuit can be used. The single detector is selectively connected to various shift register loops via the read decoder.

In the magnetic decoders, the basic element is an OR-switch which consists of a current loop superimposed on a permalloy T bar pattern in a shift register. A proper arrangement of these OR switches permits the selection of one out of $2^N$ shift registers by N control conductors for read or write operations. The decoders have $2^N$ double propagation channels, each of which has two parallel paths. One path connects a bubble domain generator to a shift register while the other path terminates in a bubble buster. Depending upon the presence or absence of control signals, bubble domain inputs from the generators are propagated to selected shift registers or are destroyed.

These and other objects, features, and advantages of this invention will be more evident after the following more particular description of the invention.

BRIEF DESCRIPTION OF THE DRAWING

FIG. 3A shows a write or read decoder used to connect $2^N$ data sources (generators or shift registers) to $2^N$ outputs.

FIG. 3B is a truth table for the decoder of FIG. 3A, where $N=2$.

FIG. 4 shows an alternate embodiment of a OR switch, using conductor loops.

DETAILED DESCRIPTION OF THE PREFERRED EMBODIMENTS

Figure 1:
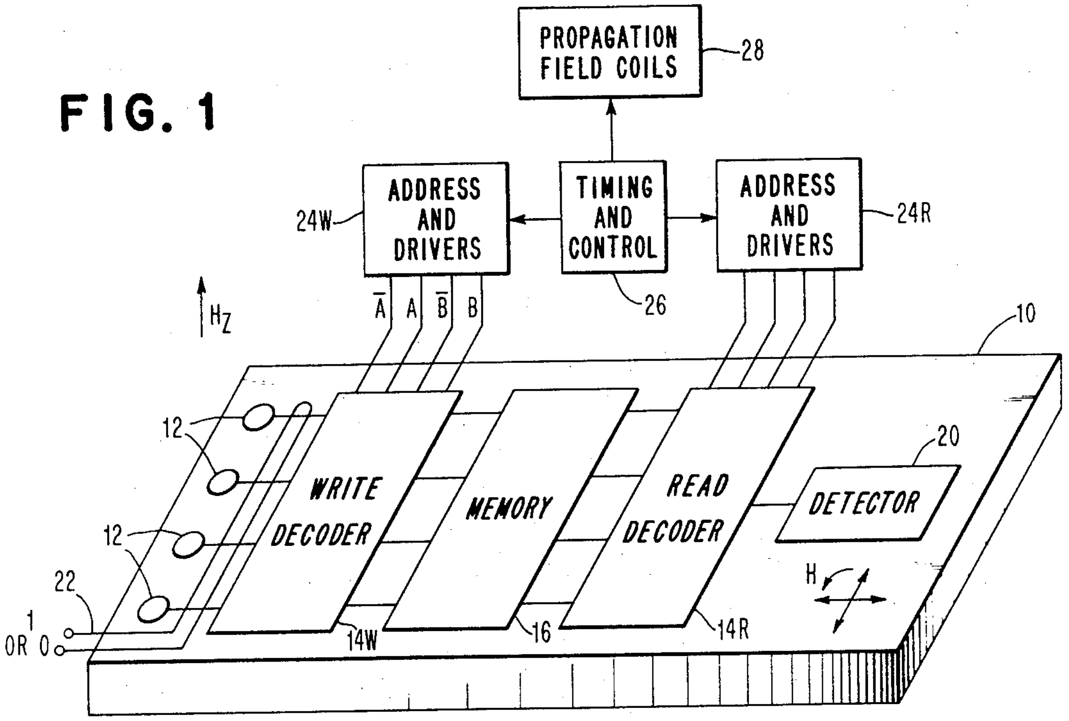
FIG. 1 is a schematic illustration of a magnetic chip having a complete memory system thereon, with only a minimum number of communication lines to the environment outside the magnetic chip.

FIG. 1 shows a magnetic chip 10 suitable for cylindrical bubble domain propagation, such as orthoferrite or garnet. Located on chip 10 is a complete memory system, comprising bubble domain generators 12, write decoder 14W, memory storage locations 16, read decoder 14R, and bubble domain detector 20. Inhibit control loop 22 is provided for domain generators 12, to control whether a 1 or a 0 is written into various portions of the write decoder 14W. Propagation of bubble domains in the memory chip is assumed to be caused by rotating the propagation field H, shown as an in-plane, counterclockwise rotating magnetic field. Of course, other propagation means can be used, including current loops, herringbone structures, and angelfish patterns, all of which are well known in this technology. A bias (stabilizing) magnetic field $H_z$ is provided normal to chip 10. Alternatively, a permanent magnet layer may be exchange coupled to the storage medium to provide an effective bias field.

In addition to the external connections to one/zero control loop 22, external connections are provided to the write and read decoders. Thus, write decoder 14W operates under control of address and driver unit 24W, while read decoder 14R operates under control of address and driver unit 24R. The address and driver units 24W and 24R provide N control lines to write decoder 14W and read decoder 14R, respectively. In the particular example shown, $N=2$ and control inputs $\bar{A}$, A, $\bar{B}$, B are provided to write decoder 14W. These designations are consistent with those used in FIG. 3A, where the decoder is shown in more detail. Of course, it is to be understood that read decoder 14R is similar to write decoder 14W, and the control lines connected thereto are correspondingly similar. It is possible to combine the read and write decoders.

Timing and control circuitry 26 is used to provide synchronization and control pulses to address and driver units 24W and 24R, as well as to the propagation field coils 28, which provide the rotating, in-plane propagation field H for bubble domain movement.

In operation, write decoder 14W enters the inputs of the bubble domain generators 12 selectively into various memory locations. In FIG. 1, four domain generators are shown while four lines connect write decoder 14W and memory 16. Correspondingly, read decoder 14R connects the various locations in memory 16 selectively to a detector 20, which senses the presence or absence of a bubble domain. Detector 20 can be any known means for sensing bubble domains, and preferably will be a magneto-resistive sensing means, as described in co-pending applications Ser. No. 78,531, and Ser. No. 89,964, filed Oct. 6, 1970 and Nov. 16, 1970, respectively.

The particular memory 16 chosen can be any from a number of known bubble domain memories. For instance, closed loop shift registers are particularly suitable and will be described herein. Other shift register embodiments which are suitable include those described in the aforementioned prior art.

Since an essential feature of a complete on-chip memory system is the use of a magnetic domain decoder, such decoders will now be described in more detail.

Figure 2:
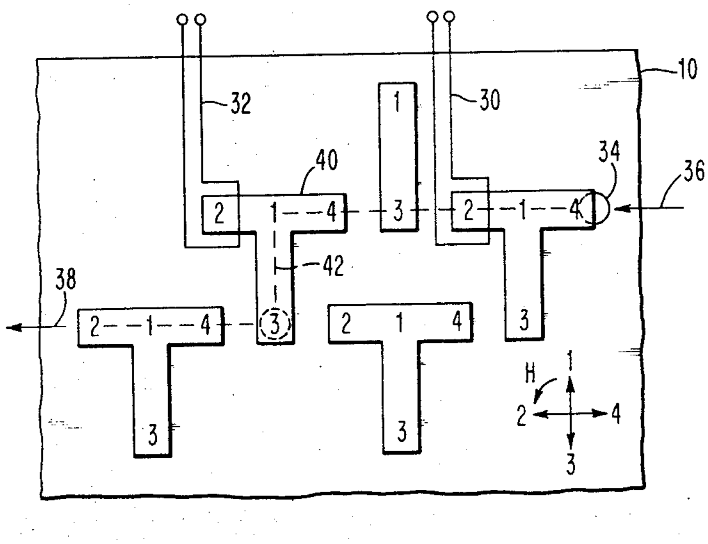
FIG. 2 is an illustration of the basic OR switch used in the decoders, using permalloy T and I bar patterns with superimposed current loops.

FIG. 2 shows a basic OR switch used to provide decoding functions. In this embodiment, the propagation channels of the OR switch are comprised of permalloy T and I bars. Located over and insulated from certain portions of these bars are various control lines 30 and 32. The presence of a current on a control line causes a bubble domain, such as 34, to leave propagation channel 36 and travel in propagation channel 38. Specifically, currents in these control loops provide magnetic fields which oppose the attractive magnetic fields of the poles of the T and I bar elements. This means that the domains 34 will be arrested in their propagation during that portion of the rotation of the propagation field H when a current is present in the loops 30 or 32.

In more detail, domain 34 is propagating in the direction of arrow 36 in that channel. Current loop 30 is not carrying a current during the first complete rotation of magnetic field H. Therefore, domain 34 moves to position 4 on the T bar element 40. When field H rotates to position 1, domain 34 moves to position 1 on T-bar 40.

If a suitably directed current exists in control loop 32 to repel the domain while magnetic field H is rotating to position 2, domain 34 will not move from position 1 to position 2 on T bar 40. Instead, it will remain at position 1 while magnetic field H rotates past direction 2. When magnetic field H approaches direction 3, domain 34 will follow the broken line 42 to position 3 on T-bar 40. After this, the domain will further move to the left in the direction of arrow 38 as magnetic field H continues its counterclockwise rotation. Thus, domain 34 has moved from propagation channel 36 to propagation channel 38 under the influence of a control signal in control line 32. These control lines do not have to be electrically insulated from the underlying permalloy overlays used for the T and I bar elements because the T and I bar elements are not electrically connected to each other and do not short circuit the control lines properly laid out. The above fact helps with fabrication simplification. Current in the loops is in a direction to cause a magnetic field normal to platelet 10 which is oppositely directed to the stray magnetic field produced by the magnetic charges induced at the poles of the T and I bar elements by rotating field H. This basic OR circuit can be used to provide decoding functions as will be apparent from the following discussion.

FIG. 3A shows a decoder using various control windings, $\bar{A}$, A, $\bar{B}$, B. Note that $\bar{A}$ and A are complementary, and can be derived from one driver. In FIG. 3A, the decoder will be discussed in terms of a write decoder connecting $2^N$ bubble generators 12 to $2^N$ shift registers located in memory 16. Of course, it will be readily understood that this decoder could be a read decoder which selectively connects any memory location in memory 16 to a sense amplifier and detector used to determine the presence or absence of bubble domains in various memory locations.

In FIG. 3A, domain generators 12 are located on magnetic chip 10. A "1 or 0" control loop 22 serves to block or pass bubble domains provided by generators 12. For ease of explanation, the same reference numerals will be used in all figures whenever possible.

Bubble generators 12 are conventionally known and can use a rotating permalloy disc known in the prior art, or the apparatus described in copending application Ser. No. 103,048, filed Dec. 31, 1970 and now U.S. Pat. No. 3,662,359 and assigned to the present assignee.

The decoder is provided with a number of propagation channels, there being a double propagation channel provided for each bubble generator 12. The double propagation channel has one portion 44A which is connected to a location in memory 16 (such as a shift register) and a second portion 44B which is connected to a bubble buster 46. Domains 34 from generators 12 are transmitted along portions 44A or 44B, depending upon the presence or absence of control signals in the control windings $\bar{A}$, A, $\bar{B}$, B.

The bubble busters shown here are those described in aforementioned copending application Ser. No. 103,244. They comprise permalloy bars 48A and 48B, which is shown as a dashed line denoting that this bar is located on the other side of the magnetic chip 10. As is apparent from the copending application, bubble busters 46 use a localized magnetic field produced between elements 48A and 48B to collapse bubbles trapped between these bars.

The decoders and bubble busters, as well as the generators 12 and shift registers provided in memory 16, use the same rotating in-plane field H. No other inputs are required for operation of the complete system configuration, other than the minimum number of external control signals required.

FIG. 3B is a truth table for the decoder of FIG. 3A. Thus, depending upon the presence or absence of currents in the various control windings, selected bubble generators 12 can be connected to various shift registers of memory 16. For instance, to connect bubble generator 12–0 to shift register 0, a current pulse is directed in control windings $\bar{A}$ and $\bar{B}$, but not in control windings A and B. Thus, a domain 34 will propagate across T bar 50 without having its path interrupted, since no control signal is present in loop B. The domain will continue to T bar 52 without interruption. It will pass T bar 52 since, even though a current is present in winding $\bar{B}$, the two conductors of the winding $\bar{B}$ are too close together in the vicinity of T bar 52 to provide a magnetic field which would cancel the effect of an attractive pole at position 3 of T bar 52. In a similar fashion as for T bar 50, the domain propagates under T bar 54 to T bar 56, since there is no current in control winding A. After passage of T bar 56, the domain will continue to shift register 0 of memory 16, under the influence of the rotating propagation field H. In a similar fashion, other domain generators 12–1, 12–2, 12–3 can be sequentially or simultaneously connected to various shift registers 1–3 of memory 16.

FIG. 4 shows an alternate embodiment for the basic OR switch of the decoder. In this embodiment, conductor loops are used. Thus, a domain propagating in the direction of the arrow 58 will have its path changed to that of arrow 60 if a control current $I_c$ is present in conductor loop 62 located on the underside of magnetic chip 10. The current $I_c$ establishes a magnetic field which opposes that produced by conductor loop 64 and consequently domain 34 will move from the main conductor loop 66 to a position beneath conductor loop 68. After this, the domain will move in the direction of arrow 60 in response to sequential currents in conductor loops 64 and 70.

Using the principles indicated by the embodiment shown in FIGS. 2 and 4, it is also possible to provide suitable OR switches using herringbone structures or angelfish patterns, which are representative samples of other bubble domain propagation means.

Figure 5:
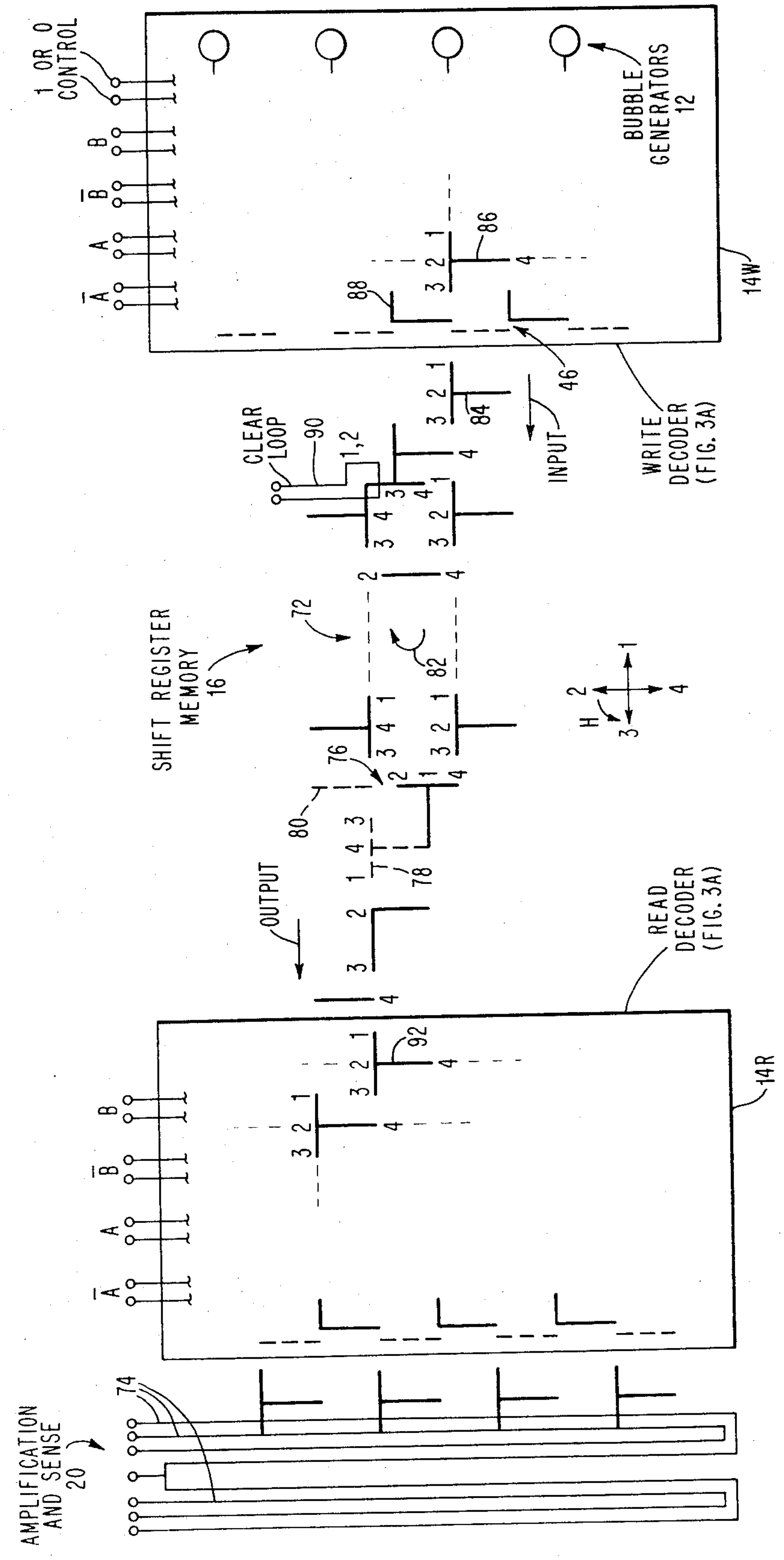
FIG. 5 shows a complete, on-chip memory system using permalloy T and I bars, and conductor loop overlays.

Now that the magnetic bubble domain decoders have been shown and described, it only remains to illustrate the detailed interconnections of the memory unit and the write and read decoders, together with the detector 20 in order to illustrate a complete on-chip memory system. Such a system is shown in FIG. 5. In this FIG., only one shift register loop 72 is shown, it being clear that other loops may be provided in the same fashion. Thus, only portions of read decoder 14R and write decoder 14W are shown, to illustrate the connection between the various propagation means in each portion 14R, 14W, 16, and 20 of the memory system.

The write decoder 14W and read decoder 14R are the same as that shown in FIG. 3A. Consequently, the control windings to these units are given the same reference letters. The only difference is that write decoder 14W connects domain generators 12 to various shift register loops 72 in memory 16, while read decoder 14R connects the shift register loops 72 to amplification and sense unit 20.

Loop 72 is a closed loop having a bubble splitter 76 therein. This bubble splitter provides non-destructive readout of the information in loop 72, since one of the split bubbles will continue to circulate in loop 72 while the other will be directed to the read decoder 14R and then to the amplification and sense unit 20.

Bubble splitter 76 can be the same as that shown in aforesaid copending application Ser. No. 102,244. The splitter uses a permalloy T and I bar overlay under the magnetic chip 10. This overlay is indicated by the dashed T and I bars 78 and 80, respectively. A bubble domain which enters splitter 76 will undergo forces mutually tending to pull it toward the read decoder and in the direction of circulation indicated by arrow 82, in addition to a force directed normal to magnetic chip 10 which tends to pinch the stretched bubble domain. Thus, the domain will split and non-destructive readout is possible.

T bar 84 is located near T bar 86 and L bar 88, of write decoder 14W. Domains propagating from element 86 to L bar 88 will, upon subsequent rotation of magnetic field H, pass beneath T bar 84 and enter circulation loop 72. This information will continue to circulate in loop 72, undergoing a splitting operation each time bubble splitter 76 is passed.

A clear loop 90 is provided for shift register 72, in order to remove information stored therein. The clear loop creates a localized normal magnetic field sufficient to collapse the domain when a current exists in the loop. After passage of the output bubble by T bar 78, the bubble domain enters read decoder 14R, via T bar 92. Depending upon the control signals present on lines $\bar{A}$, A, $\bar{B}$, and B, this domain may or may not propagate to the amplification and sensing unit 20. Assuming that it will, the domain will be flux sensed by the conductor loops 74 of sense unit 20. An output indicative of the presence or absence of the domain will thus be indicated. While conductor loops are shown as the sensing means in FIG. 5, it is to be understood that a more suitable sensing means comprises a magneto-resistive sensor, preferably fabricated from the same material utilized for the T and I bar arrays. Further, multiple sense amplifiers can be provided for each output propagation channel of read decoder 14R, or a single sensing means can be provided. If desired, a funnel circuit can be used to propagate each output channel of read decoder 18 to the particular sensing means 20.

What has been shown is a complete on-chip magnetic system for bubble domains. This complete system uses only the propagation field (or currents for propagation by conductor loops) and has a minimum number of external connections. If desired, bubble domain generators may be placed at the input of the shift registers 72 in addition to those at the input of the write decoder 14W. In this case, decoder 14W will guide a single "mother" bubble to the shift register bubble generator, which provides subsequent inputs to the shift register loops 72. This arrangement has the virtue of minimum power dissipation in the write decoder since it contains only one bubble domain during the write-in into the shift registers.

Usually all N lines in a decoder are activated simultaneously so that a series of bubble domains are gated simultaneously. However, to just guide one bubble domain through the decoder, successive lines can be gated consecutively. In this case, the successive decoding lines can be all connected in series. Selective gating is achieved by the coincidence of a pulse and a bubble domain at a location. Theoretically only one decoding line is needed for the entire memory. However, this has the disadvantage that there is a long write time per bit.

In the operation of the basic decoder, all decoding line pairs (each line and its complement) are activated, resulting in the selection of a unique channel for propagation. If one line pair is unactivated, two channels will propagate. In general, if an additional pair is left unactivated, the number of propagating channels will double. This method may be used to access a block of shift registers, for example, those with consecutive addresses. Moreover, if the addresses are divided in sections representing tags, the memory can be accessed by identifying a tag. It should be noted that for multiple word access, each shift register must be provided with an individual one/zero control line for write-in, and/or an additional sensing element for readout. The additional components of bubble generators and magnetoresistive detectors do not add cost in a batch fabrication process. However, added interconnections may result.

If the decoding line pattern overlapping with a channel in a decoder is repeated for M channels, the same decoding pulses will simultaneously select the corresponding M shift registers. Thus, an expanded decoder may be used to select one out of $2^N$ groups of shift registers, and increase the data rate by a factor of M.

What is claimed is:

1. A memory system for magnetic bubble domains, comprising:
   - a magnetic sheet in which said domains can exist,
   - domain input means located adjacent said magnetic sheet for producing domains representative of binary information,
   - storage means for storage of said domains, the presence and absence of said domains being representative of said binary information,
   - decoding means located adjacent said magnetic sheet between said domain input means and said storage means for movement of said domains to selected storage means,
   - control means connected to said decoding means for providing inputs to said decoding means for movement of said domains to selected storage means,
   - sensing means for detection of the presence and absence of said domains in said storage means.

2. The system of claim 1, where said domain input means, said decoding means, and said storage means are responsive to a reorienting magnetic field in the plane of said magnetic sheet.

3. The memory system of claim 2, where said domain input means, said decoding means, and said storage means are comprised of magnetically soft elements.

4. The memory system of claim 1, where said decoding means is comprised of a plurality of alternate propagation paths between said domain input means and said storage means, and a plurality of current carrying conductors crossing said alternate paths and connected to said control means, current pulses in selected conductors providing movement of said domains to said selected storage means.

5. The system of claim 4, where there are $2.2^N$ propagation paths located between said domain input means and said storage means, and N said current carrying conductors.

6. The system of claim 1, where each said storage means is a shift register connected between said sensing means and said decoding means, said shift registers, decoding means, and said domain input means being comprised of magnetically soft elements which are responsive to a reorienting magnetic field in the plane of said sheet.

7. The system of claim 6, having one domain input means for each shift register and decoding means located between each shift register and its associated domain input means, where each decoding means provides alternate propagation paths for domains traveling between each input means and its associated shift register, one of said propagation paths terminating in a domain collapser.

8. A memory system using magnetic bubble domains, comprising:
   - a magnetic sheet in which said domains can exist,
   - domain input means located adjacent said magnetlc sheet for producing domains representative of binary informatIon,
   - storage means for storage of said domains, the presence and absence of said domains being representative of said binary information,
   - decoding means located adjacent said magnetic sheet between said storage means and said sensing means for movement of said domains from selected storage means to said sensing elements,
   - control means connected to said decoding means for providing inputs to said decoding means for movement of said domains from said selected storage means,
   - sensing elements for detection of the presence and absence of said domains in selected storage means.

9. The system of claim 8, where said domain input means, said decoding means, and said storage means are responsive to a reorienting magnetic field in the plane of said magnetic sheet.

10. The system of claim 9, where said domain input means, said decoding means, and said storage means are comprised of magnetically soft elements.

11. The system of claim 8, where said decoding means is comprised of a plurality of alternate propagation paths located between said storage means and said sensing means, there being a plurality of current carrying conductors crossing said alternate paths and connected to said control means, current pulses in said conductors providing movement of domains in selected paths from said selected storage means.

12. The system of claim 11, where there are $2.2^N$ propagation paths located between said storage means and said sensing means, and N said conductors.

13. The system of claim 8, where each said storage means is a shift register connected between said decoding means and said domain input means, said shift register, decoding means, and said domain input means being comprised of magnetically soft elements which are responsive to a reorienting magnetic field in the plane of said sheet.

14. The system of claim 13, wherein there is a domain input means for each shift register and a decoding means located between each said shift register and said sensing means, there being multiple propagation paths for domains between each said shift register and said sensing means, one of said paths being terminated in a domain collapser.

15. A memory system for magnetic bubble domains, comprising:

a magnetic sheet in which said domains can exist, a domain input means located adjacent said magnetic sheet for generation of said domains representative of binary information, a storage means for storage of said domains, the presence and absence of said domains being representative of said binary information, a first decoding means located between said input means and said storage means for movement of said domains to selected storage means, sensing means for detecting the presence and absence of domains in said storage means, second decoding means located between said storage means and said sensing means for moving domains from selected storage means to said sensing means for detection thereof.

16. The system of claim 15 where said domain input means, said first and second decoding means, and said storage means are responsive to a reorienting magnetic field in the plane of said magnetic sheet.

17. The system of claim 16, where said domain input means, said first and second decoding means, and said storage means are comprised of magnetically soft elements.

18. The system of claim 15, where said first and second decoding means is each comprised of a plurality of alternate propagation paths located between said storage means and said domain input means and between said storage means and said sensing means, respectively, there being a plurality of current carrying conductors crossing said alternate paths and being connected to said control means, wherein current pulses in selected conductors provide movement of said domains to and from selected storage means.

19. The system of claim 18, where there are $2.2^N$ propagation paths located in each said decoding means, and N said current carrying conductors threading each decoding means.

20. The system of claim 15, where each said storage means is a shift register located between said first and second decoding means, said shift registers, said decoding means, and said domain input means being comprised of magnetically soft elements which are responsive to a reorienting magnetic field in the plane of said sheet.

21. The system of claim 20, where each said shift register has a domain input means associated therewith and a first decoding means located between said domain input means and its associated shift register, each said first decoding means having multiple propagation paths between said domain input means and its associated shift register, and further where each shift register has a second decoding means located between it and an associated sensing means, each said second decoding means having multiple propagation paths located between said sensing means and its associated shift register.

* * * * *